(No Model.)
L. McCARTHY.
INSULATING JOINT.
No. 554,394. Patented Feb. 11, 1896.
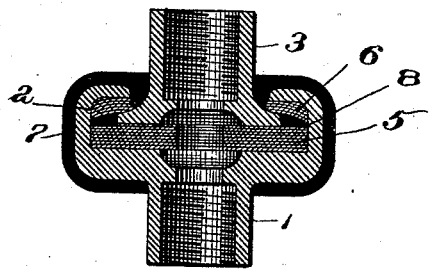
Fig. 1.
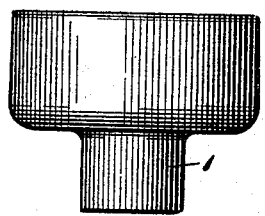
Fig. 2.
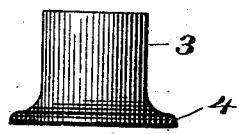
Fig. 3.
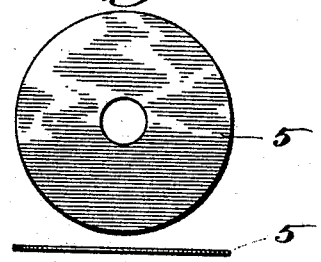
Fig. 4.
Fig. 5.
Witnesses:
Arthur L. Randall
Robert Wallace
Inventor:
Louis McCarthy
By Macleod Calver & Randall
His Attorneys.

UNITED STATES PATENT OFFICE.

LOUIS McCARTHY, OF BOSTON, MASSACHUSETTS.

INSULATING-JOINT.

SPECIFICATION forming part of Letters Patent No. 554,394, dated February 11, 1896.

Application filed October 14, 1895. Serial No. 565,552. (No model.)

*To all whom it may concern:*

Be it known that I, LOUIS MCCARTHY, a citizen of the United States, residing at Boston, in the county of Suffolk and State of Massachusetts, have invented certain new and useful Improvements in Insulating-Joints, of which the following is a specification, reference being had therein to the accompanying drawings.

My invention relates more particularly to the manufacture of insulating-joints for electroliers or chandeliers. As is well understood, a joint for such use comprises, essentially, two nipples or the like, which are screw-threaded to receive the correspondingly screw-threaded ends of the pipes which the joint is intended to connect. The said nipples are connected together in a convenient manner, and insulating material is applied, so as to insulate the said nipples from each other electrically.

In the accompanying drawings, Figure 1 represents in vertical central section one form of joint of the character above indicated. Figs. 2 and 3, respectively, show in elevation the two metallic parts of the joints shown in Fig. 1. Figs. 4 and 5 show one of the rings of insulating material which are employed.

At 1 in the drawings is a nipple or "connection," as it otherwise is termed, which is formed with a cup-shaped portion or cavity 2 at one end thereof.

At 3 is a second nipple or connection, it being formed at one end thereof with a simple flange 4.

In assembling the parts of the joint the flanged portion of the nipple or connection 3 is introduced into the cup-shaped cavity of the nipple or connection 1, rings 5 of mica being interposed between the inner end of the nipple or connection 3 and the bottom surface of the cavity 2 of the nipple or connection 1. Upon the cylindrical portion of the nipple or connection 3, above the flange 4 thereof, rings 6 of mica are placed. After placing the rings 5 and 6 of mica in place the free edge of the cup-shaped portion of the connection 1 is turned inwardly above the flange 4 of the connection 3, over the rings 6 of mica, and said free edge is pressed firmly into place, thereby securing the parts together. As is apparent and well known, the mica rings 5 and 6 are used for the purpose of electrically insulating the nipples or connections from each other. A defect of insulating-joints made in this manner has been the want of perfect insulation around the edge of the flange 4 of the connection 3. As will be obvious, such flange separates the upper rings, 6, of mica, from the lower ring, 5, and even although the heavy compression to which the parts are subjected in the process of manufacture may cause the outer edges of the two sets of rings to approach more or less, it is found on examination that an air-space usually exists around the outer periphery of the flange. There always is liability of electrical leakage across this air-space between the flange 4 and the inner surface of the cup-shaped portion. In the endeavor heretofore to remedy this defect a small quantity of plastic insulating compound has been introduced around the outer edge of the flange 4 in Fig. 1 in the operation of assembling the parts of the joint, so as to prevent the existence of such air-space, as has been mentioned. It has been found, however, that under the exceedingly-great pressure to which the parts are subjected in closing down the edge of the nipple or connection 1, as in Fig. 1, in order to unite the parts, the plastic composition thus introduced has been crumbled and disintegrated, so that it loses the power of accomplishing the purpose for which it is used.

In proceeding in accordance with my invention I insert the mica 5 and nipple 3 into the cup-shaped cavity of the nipple 1, and then, they being in proper position, I coat with an insulating-paint or the like the outer surface of flange 4, the opposite portion of the interior opposing surface of the cup-shaped portion of nipple 1, and the exposed portion of the surface of the mica 5. Then I dust in a small quantity of dry powdered insulating substance or compound capable of being rendered plastic by heat, such portion thereof as does not adhere to the sticky surfaces being shaken out. Enough of the powder will be retained by the paint to completely fill the air-space which would be formed around the flange 4. Various substances or compounds of this character are well known. Then the remaining parts are put into place, and the edge of the cup-shaped portion of nipple 1 is compressed into place. By the subsequent application of heat, as during the operation of molding on the exterior coating 7, the powdered insulating substance or compound is rendered plastic and on cooling remains solid, forming an integral mass 8 of a shape corresponding with that of the space in which it is placed.

As will of course be apparent, the invention is equally applicable in the manufacturing of insulating-joints and the like of different forms and constructions from that shown herein.

I claim as my invention—

The improved process of manufacturing insulating-joints and the like, which consists in applying, during the assembling of the parts, a suitable quantity of dry powdered insulating substance or compound at the places where air-spaces are likely to be formed in the completed article, and subsequently rendering such substance or compound plastic and solid by the application of heat, substantially as described.

In testimony whereof I affix my signature in presence of two witnesses.

LOUIS McCARTHY.

Witnesses:
    ALICE H. MORRISON,
    CHAS. F. RANDALL.